United States Patent
Chatfield et al.

(10) Patent No.: US 9,567,996 B2
(45) Date of Patent: Feb. 14, 2017

(54) PULSATION ATTENUATION

(75) Inventors: Glen F. Chatfield, Bradfordwoods, PA (US); John G. Crandall, North Versailles, PA (US)

(73) Assignee: OPTIMUM Pumping Technology, Inc., Bridgeville, PA (US)

( * ) Notice: Subject to any disclaimer, the term of this patent is extended or adjusted under 35 U.S.C. 154(b) by 2683 days.

(21) Appl. No.: 12/189,630

(22) Filed: Aug. 11, 2008

(65) Prior Publication Data

US 2009/0038684 A1 Feb. 12, 2009

Related U.S. Application Data

(60) Provisional application No. 60/954,914, filed on Aug. 9, 2007.

(51) Int. Cl.
| | |
|---|---|
| *F04B 53/00* | (2006.01) |
| *F04B 11/00* | (2006.01) |
| *F04B 39/00* | (2006.01) |
| *F01C 21/00* | (2006.01) |
| *F02B 33/44* | (2006.01) |
| *F16L 55/04* | (2006.01) |

(52) U.S. Cl.
CPC ........... *F04B 53/001* (2013.01); *F01C 21/006* (2013.01); *F02B 33/44* (2013.01); *F04B 11/0091* (2013.01); *F04B 39/0055* (2013.01); *F16L 55/04* (2013.01); *F04C 2270/12* (2013.01); *F04C 2270/14* (2013.01); *Y02T 10/17* (2013.01); *Y10T 137/0318* (2015.04); *Y10T 137/87265* (2015.04)

(58) Field of Classification Search
USPC ............... 137/599.01; 417/312; 181/251
See application file for complete search history.

(56) References Cited

U.S. PATENT DOCUMENTS

| | | | | |
|---|---|---|---|---|
| 2,297,046 | A | | 9/1942 | Bourne |
| 2,501,751 | A | * | 3/1950 | Aldridge .................. 137/565.34 |
| 3,323,305 | A | * | 6/1967 | Klees ............................ 60/469 |
| 3,820,921 | A | * | 6/1974 | Thayer ......................... 417/312 |
| 4,459,945 | A | | 7/1984 | Chatfield |
| 4,600,076 | A | * | 7/1986 | Yamamoto et al. .......... 181/233 |
| 5,033,581 | A | * | 7/1991 | Feuling ........................ 181/257 |
| 5,762,479 | A | * | 6/1998 | Baars et al. .................. 417/312 |
| 5,957,664 | A | * | 9/1999 | Stolz et al. .................... 417/53 |
| 6,155,800 | A | * | 12/2000 | Todescat et al. ............. 417/312 |
| 6,633,646 | B1 | * | 10/2003 | Hwang ........................ 381/71.5 |
| 6,796,859 | B1 | * | 9/2004 | Justen et al. ................ 440/88 A |
| 2004/0103683 | A1 | * | 6/2004 | Yoon .............................. 62/296 |

(Continued)

FOREIGN PATENT DOCUMENTS

| | | |
|---|---|---|
| DE | 734858 C | 4/1943 |
| DE | 4341951 A1 | 6/1994 |

(Continued)

OTHER PUBLICATIONS

S.N. Panigrahi and M.L. Munjal, Plane wave propagation in generalized multiply connected acoustic filters, J. Acoust. Soc. Am., Nov. 2005, 2860-2868, vol. 118, No. 5, Acoustical Society of America, Melville, N.Y., USA.

(Continued)

*Primary Examiner* — Alexander Comley

(74) *Attorney, Agent, or Firm* — Richard W. James

(57) ABSTRACT

A system, apparatus, and method for attenuating pulsations in a pumping system.

10 Claims, 5 Drawing Sheets

(56) References Cited

U.S. PATENT DOCUMENTS

2004/0234386 A1   11/2004   Chumley et al.

FOREIGN PATENT DOCUMENTS

FR      1601315 A    8/1970
GB       121212 A   12/1918

OTHER PUBLICATIONS

Chad D. Brahler, Glen F. Chatfield, John G. Crandall, W. Norman Shade, An Investigation of the Application of Finite Amplitude Wave Simulation with a New Technology for Controlling Reciprocating Compressor Pulsations, 2007 GMRC Gas Machinery Conference, Oct. 1-3, 2007, Dallas, Texas.

* cited by examiner

PULSATION ATTENUATION

CROSS-REFERENCE TO RELATED APPLICATIONS

The present application claims priority to U.S. provisional patent application No. 60/954,914, filed Aug. 9, 2007, which is incorporated herein in its entirety and is currently pending.

FIELD OF THE INVENTION

The present invention is concerned with reducing pulsations in fluid systems. An embodiment of the invention also increases fluid flow over traditional systems, resulting in smoother, more efficient fluid flow in a closed system.

BACKGROUND OF THE INVENTION

A fluid, whether gaseous or liquid, may flow through a conduit or duct. The fluid may be propelled by a pressure creating device, such as a compressor or other type of pump. One type of compressor used to propel fluid, particularly gas, is a reciprocating compressor. Effective control of the pressure pulsations generated by reciprocating compressors is desirable to prevent damaging shaking forces and stresses in system piping, vessels, and mechanical equipment and structures, as well as to prevent detrimental time-variant suction and discharge pressures at the compressor cylinder flanges. The pressure and flow delivered by reciprocating compressors varies throughout the stroke of each compressor cylinder piston, thus creating pressure variations over time.

A reciprocating compressor may have a piston that is moved alternately toward one end of a cylinder and then to an opposing end of the cylinder and fluid may be propelled from the cylinder by the piston in either one or both directions of piston movement. Reciprocating compressors may use single-acting pistons or double-acting pistons. The double-acting pistons compress gas at the discharge of the compressor using both strokes of the piston. Exemplary double-acting compressors are those manufactured by Ariel Corporation of Mount Vernon, Ohio. The pumping action of each single-acting or double-acting piston creates complex cyclic pressure waves. The pressure waves of a double-acting piston generally have a primary frequency at twice the compressor operating speed with many harmonics. Variations in pressure within conduits and ducts created by such pumping actions are commonly referred to as pulsations.

To reduce the amplitude of the pressure waves upstream and downstream of the compressor, which could otherwise excite system mechanical natural frequencies, overstress system elements and piping, and interfere with meter measurements, it has been customary to dampen the pressure waves through the use of expansion volume bottles, choke tubes, orifices, baffles, etc. These devices are used singly or in combination to dampen pressure waves and reduce the resulting forces. However, those approaches generally result in significant system pressure losses on both the suction and discharge sides of the compressor, reducing compressor efficiency and flow capacity. Since the flow is pulsating as it moves into and out of the compressor, the amount of pressure drop typically increases with the amplitude of the pulsation.

Pressure pulsations may be controlled with a system of primary and/or secondary volume bottles, often with complex internal choke tubes, baffles, and chambers, as well as various orifice plates installed at specific locations in the system piping. These devices accomplish pulsation control by adding resistance, or damping, to the system, and they result in pressure losses that may exist both upstream and downstream of the compressor cylinders. For common pipeline transmission applications, particularly those having low pressure ratios, such as natural gas pipeline systems, pressure losses can noticeably degrade system operating efficiency. As larger high-speed compressors have been increasingly applied to pipeline transmission applications, these influences are thought to have become more detrimental to performance, due to the higher frequency pulsations that must be damped. In extreme cases in the field, traditional methods of pulsation control have been reported to add 20 percent or more to the driver horsepower requirements for high-speed, low-ratio compressors.

An investigation of a new tuning technology that involves cancellation of pulsations, rather than dampening, has been undertaken to assess its potential use for the design of reciprocating gas compressor systems. Simulations predict that this new pulsation attenuation technology can control pulsations to 1.0 percent peak-to-peak over a reasonable speed range with less than 0.1 percent overall system pressure drop.

Study has been made as to the effect of the use of differing length parallel tubes to cancel sounds of a particular wavelength. Acoustic wave interference in pipes was studied in 1833 by Herschel, who predicted that sound could be canceled by dividing two waves from the same source and recombining them out of phase after they followed paths of different lengths. Experiments by Quincke in 1866 verified that Herschel's system did suppress sound.

Variations on the Herschel-Quincke solutions have been proposed including a method for controlling exhaust noise from an internal combustion engine by using bypass pipes such as shown in U.S. Pat. No. 6,633,646 to Hwang (hereinafter "Hwang") See FIG. 1 and FIG. 5. In such an apparatus, a main exhaust pipe is provided with two U-shaped bypass pipes through which the exhaust passage of the main pipe is partially diverted before being reintegrated. With such a construction, the phase difference between the main noise components of the exhaust gas passing through the fixed pipe and the noise components of the exhaust gas passing through the first bypass pipe is adjusted 180 degrees, thus suppressing the main noise component and its odd harmonics. The length of the second bypass pipe is adjusted so that the noise component having a frequency of two times the frequency of the main noise component is suppressed. However, the above method does not effectively attenuate the 4th harmonic, i.e., the noise component having a frequency four times the main noise component, nor any other harmonics divisible by 4. Such an arrangement furthermore operates on a single primary frequency and certain of its harmonics and so is unlikely to provide effective noise attenuation over a range of noise frequencies. Furthermore, Herschel, Quincke, and Hwang directed their efforts toward sound attenuation, not pulsation attenuation. While attenuation of sound and pulsations may be achieved by similar means, they operate differently by degrees to achieve different results. For example, reduction of sound is frequently directed to human comfort and reduction of high frequency wavelengths that are bothersome to human beings. Conversely, pulsation reduction frequently focuses on reducing low frequency wavelengths that may cause damage to mechanical systems, such as pipes, conduits, ducts, mechanical equipment and structures, sometimes in critical safety applications such as natural gas pipelines.

Thus, certain embodiments of the present pulsation attenuation apparatuses and methods attenuate pulsations in a conduit or duct. While sound wave propagation cancellation and pulse propagation cancellation may be based on some of the same principles, it should be recognized by one skilled in the art of wave dynamics that reduction of sound wave propagation has a different goal and operates differently from reduction of pulse propagation.

Certain embodiments of the present pulsation attenuation apparatuses and methods may further preserve the integrity of piping and vessel systems subjected to pulsations and certain embodiments of the present pulsation attenuation apparatuses and methods may increase flow of a fluid through such systems.

Embodiments of the inventions described herein reduce pulsations in pumping systems, including pumping systems utilizing reciprocating compressors and rotary pumps (collectively referred to herein as "pumps").

Embodiments of the inventions described herein reduce energy consumption when compared with existing systems.

Embodiments of the inventions described herein increase flow in pumping systems when compared to existing systems.

Embodiments of the inventions described herein reduce the pressure differential against which pumps operate.

SUMMARY OF THE INVENTION

Embodiments of pulsation attenuation are directed to systems, methods and apparatuses for reducing pulsations and increasing flow in fluid pumping applications.

In accordance with one embodiment of pulsation attenuation, a pulsation attenuation device includes a pipe having an outlet connected to at least two loops in series. Each loop includes a first junction that divides the flow into two pipes, one pipe being longer than the other and a second junction that reconnects the two pipes to an outlet pipe. The outlet pipe of a first of the at least two loops is coupled to the first junction of a second of the at least two loops. A third loop, a fourth loop, or a higher order loop may be present in this or any of the embodiments described herein.

In accordance with an embodiment of pulsation attenuation, a pulsation attenuation device includes a pump having a variable operating speed, a first loop and a second loop. The first loop has an inlet coupled to the pump, an outlet, and two branches therebetween, the first branch being longer than the second branch by an amount equal to a first wavelength within a range of wavelengths of vibrations propagating in a fluid discharged from the pump. The second loop has an inlet coupled to the first pipe loop outlet, an outlet, and two branches therebetween, the first branch being longer than the second branch by an amount equal to a second wavelength within a range of wavelengths of vibrations propagating in a fluid discharged from the pump.

In accordance with an embodiment of pulsation attenuation, a pump pulsation attenuation device attenuates a range of pulsation frequencies. The pump pulsation attenuation device includes first and second inlet junctions, first and second outlet junctions, first and second conduits between the first inlet junction and the first outlet junction, and third and fourth conduits between the second inlet junction and the second outlet junction.

In an embodiment, the first inlet junction includes an inlet through which a fluid is pumped, a first outlet, and a second outlet. The first conduit includes a first end coupled to the first outlet of the inlet junction, a first length, and a second end opposite the first end of the first conduit. The second conduit includes a first end coupled to the second outlet of the inlet junction, a second length approximately equal to the first length plus half a first primary wavelength within a range of wavelengths of vibrations propagating in a fluid pumped by the pump, and a second end opposite the first end of the second conduit. The first outlet junction includes a first inlet coupled to the second end of the first conduit, a second inlet coupled to the second end of the second conduit, and an outlet. The second inlet junction includes an inlet in fluid communication with outlet of the first outlet junction, a first outlet, and a second outlet. In embodiments, the second inlet junction may be coupled directly to the first outlet junction or a connecting conduit may couple the second inlet junction to the first outlet junction. The third conduit is of a third length and has a first end coupled to the first outlet of the second inlet junction and a second end opposite the first end of the third conduit. The fourth conduit is of a fourth length approximately equal to the third length plus half a second primary wavelength, the second primary wavelength different from the first primary wavelength, not equal to half the first primary wavelength, and within the range of wavelengths of vibrations propagating in the fluid pumped by the pump. The fourth conduit also includes a second end opposite the first end of the fourth conduit. The second outlet junction includes a first inlet coupled to the second end of the third conduit, a second inlet coupled to the second end of the fourth conduit, and an outlet.

In an embodiment, a pump pulsation attenuation device includes first, second, third, and fourth conduits. The first conduit is of a first length and is in fluid communication with an outlet of the pump through which fluid discharged from the pump is directed. The second conduit is of a second length longer than the first length through which the fluid discharged from the pump is directed simultaneously with the first conduit. The third conduit is of a third length through which the fluid is sucked into the pump. The fourth conduit is of a fourth length longer than the third length through which the fluid is sucked into the pump simultaneously with the third conduit. Fluid communication in this embodiment may be accomplished by direct coupling or through additional conduits.

In an embodiment, a pump efficiency improvement device is provided. The pump efficiency improvement device includes a first junction, a second junction, a first branch, a second branch, and a header. The first junction has a main connector, a first branch connector, and a second branch connector. The second junction has a main connector, a first branch connector, and a second branch connector. The first branch has a first end coupled to the first branch connector of the first junction and a second end coupled to the first branch connector of the second junction. The second branch has a first end coupled to the second branch connector of the first junction and a second end coupled to the second branch connector of the second junction. The header has a first end coupled to the pump and a second end coupled to the main connector of the first junction, the header having a length that improves pressure at the pump.

The first junction of the pump efficiency improvement device may be coupled to either the inlet of the pump or the outlet of the pump. The pump efficiency improvement device may furthermore operate by reducing pressure at the outlet of the pump or by increasing pressure at the inlet of the pump by reflecting pulses toward the pump. Moreover, the pump efficiency improvement device may have branches of different lengths.

In accordance with one embodiment of pulsation attenuation, a method of attenuating pulsations created by a pump includes directing gas discharged from the pump into a first conduit of a first length, directing gas discharged from the pump into a second conduit simultaneously with the first conduit, the second conduit having a second length approximately equal to the first length plus half a first primary wavelength within a range of wavelengths of vibrations propagating in a fluid discharged from the pump, directing gas discharged from the first and second conduits into a third conduit of a third length different than the first length, and directing gas discharged from the first and second conduits into a fourth conduit of a fourth length approximately equal to the third length plus half a second wavelength, different from the first wavelength and within the range of wavelengths, simultaneously with the third conduit.

In accordance with another embodiment of pulsation attenuation, a method of attenuating pulsations created by a pump includes directing gas flowing into the pump into a first conduit of a first length, directing gas flowing into the pump into a second conduit of a second length approximately equal to the first length plus half a first wavelength in a range of wavelengths simultaneously with the first conduit, directing gas flowing into the first and second conduits into a third conduit of a third length different than the first length, and directing gas flowing into the first and second conduits into a fourth conduit of a fourth length approximately equal to the third length plus half a second wavelength, different from the first wavelength and within the range of wavelengths, simultaneously with the third conduit.

Accordingly, the present invention provides solutions to the shortcomings of prior pulsation attenuation systems, apparatuses, and methods. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of embodiments of pulsation attenuation devices and networks.

DETAILED DESCRIPTION OF THE INVENTION

Reference will now be made to embodiments of pulsation attenuation apparatuses, networks, and methods, examples of which are illustrated in the accompanying drawings. Details, features, and advantages of pulsation attenuation will become further apparent in the following detailed description of embodiments thereof. It is to be understood that the figures and descriptions included herein illustrate and describe elements that are of particular relevance to pulsation attenuation apparatuses, networks, and methods, while eliminating, for purposes of clarity, other elements found in typical fluid pumping systems.

Systems, apparatuses, and methods to perform pulsation attenuation are described herein. Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

Figure 1:
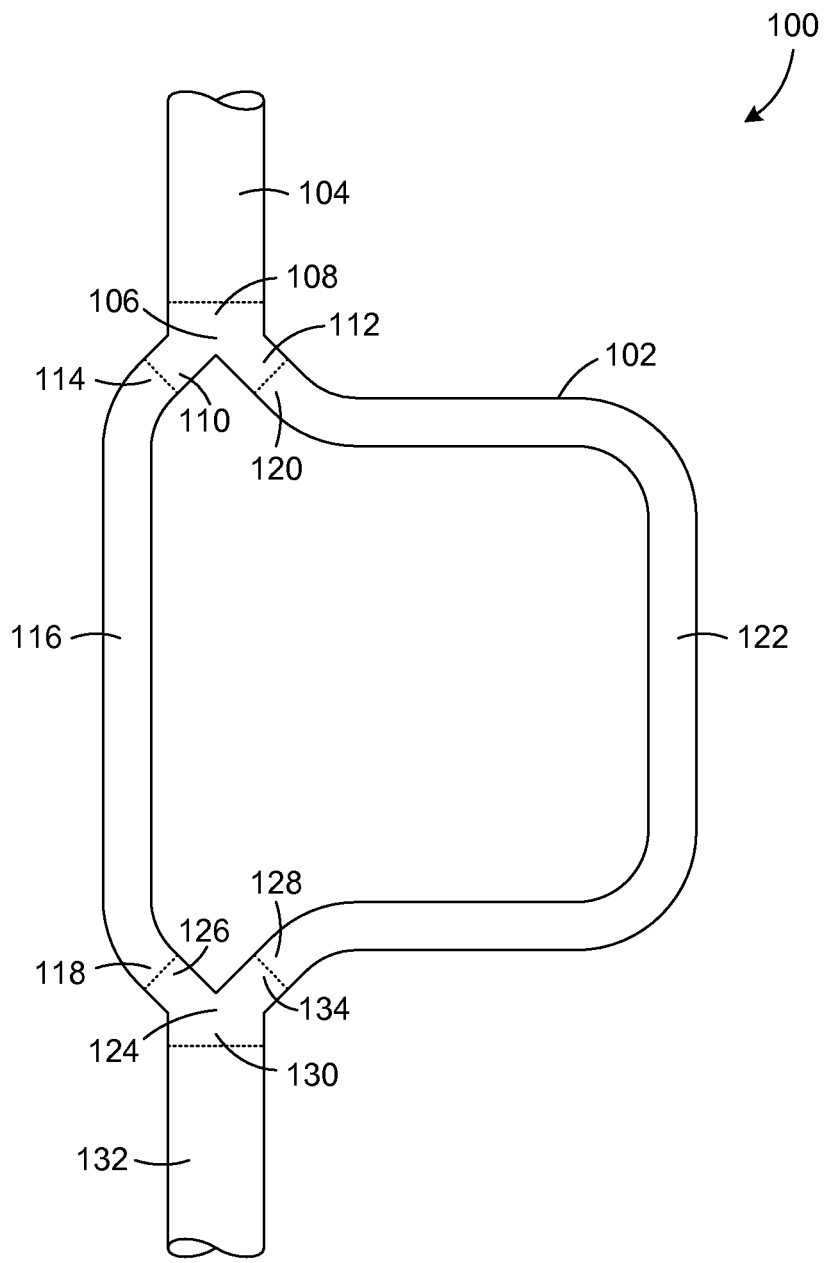
FIG. 1 illustrates an embodiment of a pulsation attenuation device.

FIG. 1 illustrates an embodiment of a pulsation attenuation device 100 having one tuned loop 102. The tuned loop 102 includes an inlet conduit 104 coupled to an inlet junction 106. The inlet junction 106 has an inlet 108 coupled to the inlet conduit 104, a first outlet 110 and a second outlet 112. The first outlet 110 of the inlet junction 106 is coupled to a first end 114 of a first branch 116, which may be a first attenuating conduit, and the second outlet 112 of the inlet junction 106 is coupled to a first end 120 of a second branch 122, which may be a first attenuating conduit.

It should be noted that the term "junction" as used herein includes any connecting device to which three or more conduits may be coupled, including, for example, a wye-, a tee- or an x-shaped junction, or a junction formed on or with a conduit. In an embodiment, the inlet junction, outlet junction, first branch, and second branch are formed as a single entity. In another embodiment, the inlet junction, outlet junction, first branch, and second branch are formed of more than one component wherein at least one junction is formed with at least one branch.

In certain embodiments, the attenuating conduits 116 and 122 are formed straight, angled, curved, or otherwise to meet the desires or constraints of an application, such as to minimize the size of the pulsation attenuation device 100.

An outlet junction 124 includes a first inlet 126 coupled to a second end 118 of the first attenuating conduit 116 and a second inlet 134 coupled to a second end 128 of the second attenuating conduit 122. The outlet junction 124 also has an outlet 130 coupled to an outlet conduit 132.

The pulsation attenuation device 100 may carry a pressurized fluid, such as, for example, natural gas. The inlet conduit 104 may be arranged in fluid communication with a pump, such as for example the pump 306 illustrated in FIG. 3, applying pressure to the fluid and the outlet conduit 132 may be in fluid communication with a system to which the pressurized fluid is carried. Fluid communication may, for example, be accomplished by direct coupling or through additional conduits. The tuned loop 102 may attenuate pulsations in a primary wavelength propagated in the fluid and odd harmonics of that primary wavelength.

Regarding conduit sizes, the inlet conduit 104 and the outlet conduit 132 may have approximately the same cross-sectional area. The first attenuating conduit 116 may have approximately half the cross-sectional area of the inlet conduit 104 and the outlet conduit 132, and the second attenuating conduit 122 may have approximately half the cross-sectional area of the inlet conduit 104 and the outlet conduit 132.

Dividing fluid flow into different length conduits then recombining those flows cancels pulses emanating from a pump 306, thereby smoothing the fluid flow. For example, where a properly designed tuned loop 102 is located downstream of the discharge of a pump 306, fluid waves downstream of the tuned loop 102 should be attenuated.

Locating a tuned loop 102 or an inlet junction 106 of a tuned loop 102 at an optimum location with respect to a pump 306 can reflect pulsations so as to increase flow or increase pump 306 efficiency. For example, where a properly designed tuned loop 102 is located at an appropriate location downstream of a pump 306, pulsations may be reflected upstream, thereby reducing pressure at the pump 306 discharge 308.

Figure 3:
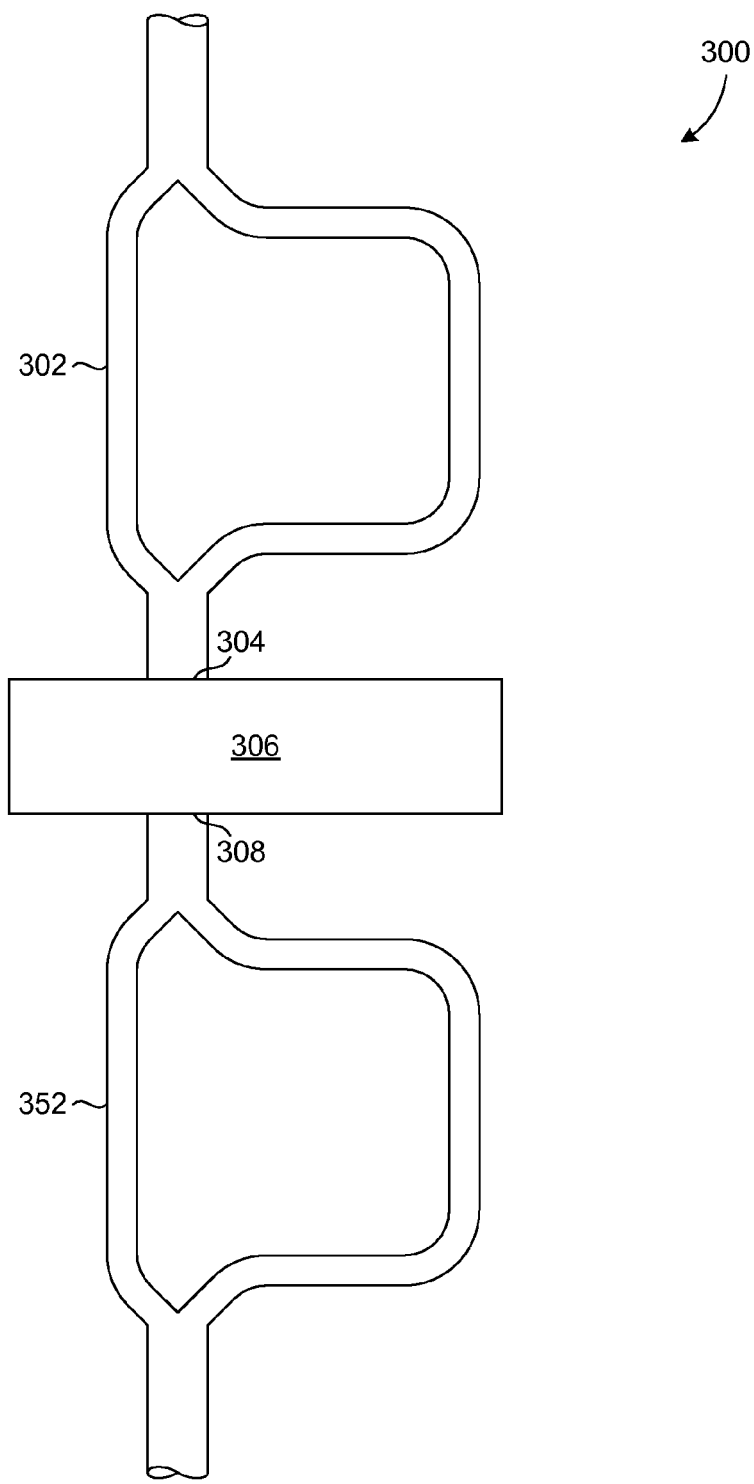
FIG. 3 illustrates an embodiment of a compressor having a pulsation attenuation device connected at each of the suction and discharge sides of the compressor.

Thus, while previous systems dissipated a significant amount of energy by muffling fluid flow, embodiments of pulsation attenuation cancel undesirable pulses, thereby dissipating less energy than muffling. Furthermore, embodiments of pulsation attenuation improve pump 306 efficiency by reducing pressure at a pump 306 outlet 308 as shown in FIG. 3. Embodiments of pulsation attenuation may improve pressure conditions at a pump inlet 304 as well.

The pulsation attenuation devices, networks, and methods described herein are based in whole or part on the following principles:

1) Repeating pulses with frequency F and period P are made up of the sum of an infinite series of sine waves with frequencies F, 2*F, 3*F, . . . periods P/1, P/2, P/3, . . . and amplitudes A1, A2, A3, . . . . These sine waves are normally referred to as the primary frequency, F, the first harmonic frequency, 2*F, second harmonic frequency, 3*F, and so on. This infinite series of sine waves is known as a Fourier series.
2) The sum of two sine waves of equal amplitude but 180 degrees out of phase is zero (i.e. the waves cancel each other [sin(X+180deg)=−sin(X)]).
3) A pulse propagating down a pipe can be divided into two roughly equal parts with a Y branch.
4) If the two divided pulses travel different distances and are recombined at a later point, the different distances will time shift, i.e. phase shift, the two pulse parts.
5) The time/phase shift caused by this delay loop will cancel frequency components that have periods of 2, 6, 10, 14, . . . times the time shift if they are present in the repeating pulse.
6) The delay loop will also attenuate, that is partially cancel, all frequencies components of the pulse in between the canceled frequencies except for the frequencies that are exactly half way in between two consecutive canceled frequencies.
7) The difference in length of the two paths can be "tuned" to one or more frequencies present in a pulse to dramatically reduce the pulsation in a conduit or duct.
8) If the length of the two paths are tuned to the rpm at which a pump is running, the pulsations will generally be substantially reduced without a significant pressure loss.

The frequency of the pump 306 is the frequency at which the pump 306 applies its propelling force. For example, in a double acting reciprocating compressor where a single double acting piston propels fluid with each motion in both directions in a cylinder, the frequency of the pulsations will be twice the frequency of the rotating speed of the compressor.

A wavelength, for purposes of this invention, is the period of the frequency times the acoustic velocity of the fluid that the pulse is propagating in. Thus, in an embodiment wherein fluid is being pumped, the primary wavelength of a pulse is the period from one propelling motion of a pump 306 to the next propelling motion of the pump 306 multiplied by the acoustic velocity of the fluid.

Pumps 306 furthermore frequently operate at various speeds. The ratio of the fastest speed to slowest speed in pumping system embodiments may be a narrow, but significant range, such as a 25% turndown rate. Moreover, in a natural gas pumping station, pump 306 speed may vary to meet a varying demand on the gas pumping system. A primary wavelength may, therefore, be established for a pump 306 that operates at one speed. The primary wavelength will vary when the speed of the pump 306 is varied. Embodiments of the present pulsation attenuation devices, networks, and methods operate to minimize pulsations created by a pump 306 operating over a range of speeds.

Different speed and load conditions under which a pump 306 operates create different repeating pulses and create different Fourier series. Embodiments of pulsation attenuation use one or more tuned loops to effectively attenuate the critical frequencies present in the Fourier series' that characterize the speed and load range of the pump 306.

It should be recognized that full cancellation may occur for sine wave frequencies when the fluid stream is divided into equal parts and recombined at 180 degrees out of phase for those sine waves. For sine waves that are recombined at 360 degrees out of phase effectively no cancellation may occur and for sine waves that are recombined at other degrees out of phase partial cancellation of those sine waves may occur. A tuned loop 102, also referred to as a delay loop herein, cancels a series of frequencies (i.e., a primary frequency and its odd harmonics) and provides partial cancellation over ranges of frequencies, while leaving certain frequencies, such as even frequencies divisible by four, not effectively attenuated. Higher harmonics tend to be lower amplitude and so not as important to cancel, thus certain higher harmonics may create pulsations that are not necessary to attenuate.

Thus, in pulsation attenuation, a first tuned loop 102 may be selected to recombine waves at 180 degrees out of phase of a primary frequency in the range of operation of the pump 306 to attenuate that frequency. It should be recognized that harmonics of that frequency will also be attenuated by that tuned loop 102.

A second tuned loop 102 may be selected to recombine waves at 180 degrees out of phase of a different primary frequency in the range of operation of the pump 306 to attenuate that frequency and harmonics of that frequency.

Because a selected number of tuned loops 102 tuned to primary frequencies in the pump 304 operating range will cancel frequencies for which they are tuned and certain harmonics of those frequencies and will also attenuate frequencies near the tuned frequencies, a small number of tuned loops 102, in many cases from two to four tuned loops 102, may be sufficient to attenuate a range of primary frequencies to a desired level.

Frequently in fluid pumping applications, the speed range of a pump may be significant enough to justify the use of two or three tuned loops 102 tuned to primary frequencies in the pump operating range, but not so large as to merit more than two or three tuned loops 102. A defined range of primary frequencies within which attenuation is desired may, therefore, be determined and a desired level of pulsation attenuation for that range may be designed using a finite number of tuned loops 102.

Additional tuned loops 102 may be employed to cancel problematic or undesirable non-primary frequencies. Accordingly, networks of two, three, or four tuned loops 102 are believed to be effective to minimize a wide range of undesirable frequencies in a fluid pumping application.

Figure 2:
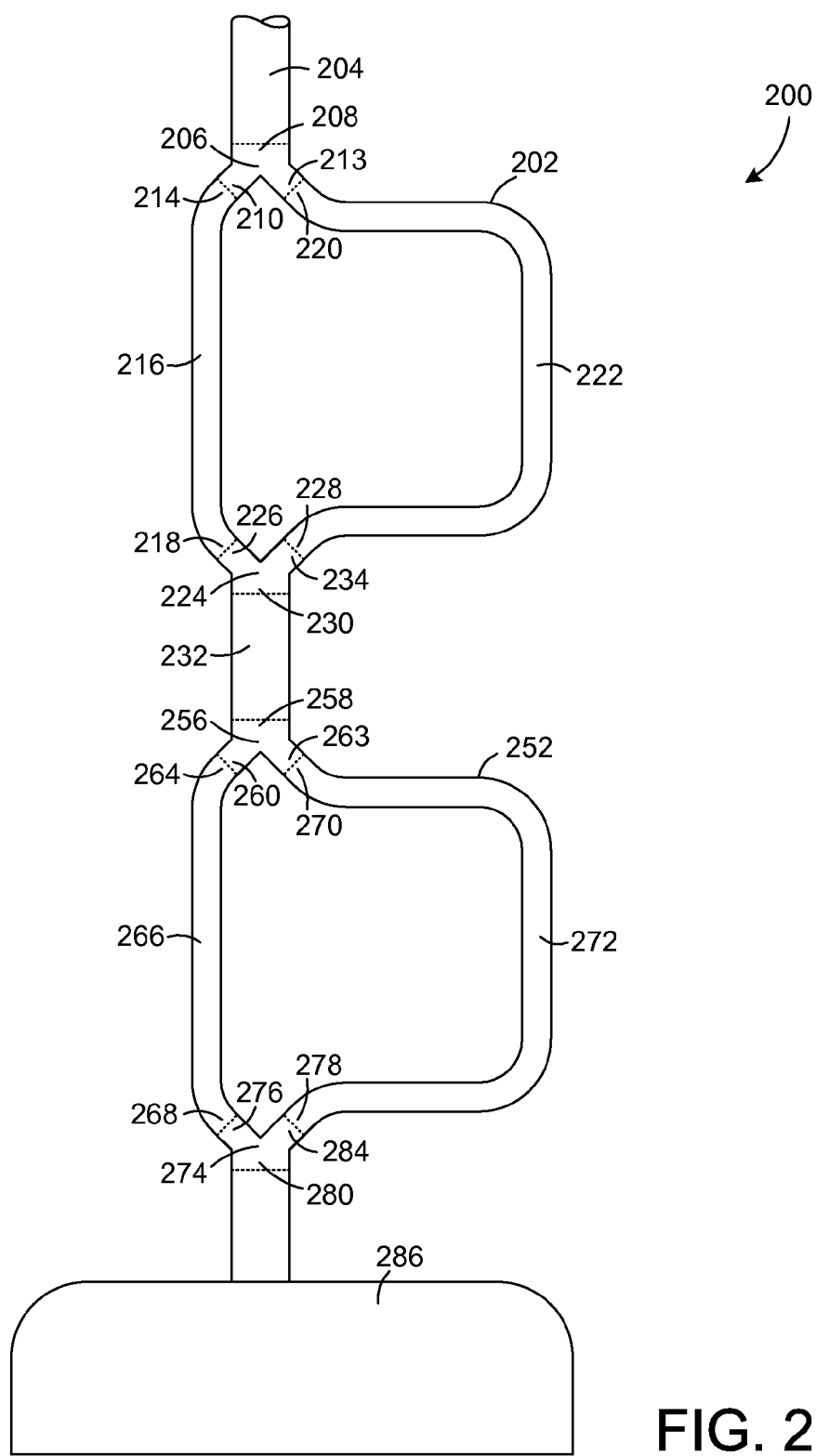
FIG. 2 illustrates an embodiment of a series pulsation attenuation device.

FIG. 2 illustrates a tuned loop network 200 that includes two tuned loops 202 and 252. Those two tuned loops 202 and 252 may each be similar to the tuned loop 102 illustrated in FIG. 1. The outlet junction 224 of the first tuned loop 202 may be coupled to the inlet junction 256 of the second tuned loop 252 or a connecting conduit 232 may interconnect the outlet junction 224 to the inlet junction 256.

A fluid, such as a gas or liquid may be pumped through the tuned loop network 200 by, for example, a reciprocating compressor. The lengths of the various conduits (i.e., 216, 222, 266, 272) may be adjusted to cancel primary pulsations and harmonics over a range of pump 306 operating speeds or conditions.

The first tuned loop 202 illustrated in FIG. 2 includes an inlet conduit 204 coupled to a first inlet junction 206. The first inlet junction 206 includes an inlet 208, a first outlet 210 and a second outlet 213. The first tuned loop 202 illustrated in FIG. 2 also includes a first attenuating conduit 216 having a first end 214 coupled to the first outlet 210 of the inlet junction 206, having a first length, and having a second end 218 opposite the first end 214.

The first tuned loop 202 illustrated in FIG. 2 also includes a second attenuating conduit 222 having a first end 220 coupled to the second outlet 213 of the inlet junction 206, having a length that is approximately equal to the length of the first attenuating conduit 216 plus half a first primary wavelength of vibrations propagating in a fluid flowing through the tuned loop network 200. Furthermore, that first primary wavelength is selected from a range of wavelengths that may be imparted on the fluid by the pump 306. The first tuned loop 202 illustrated in FIG. 2 further includes a first outlet junction 224 having a first inlet 226 coupled to the second end 218 of the first attenuating conduit 216, a second inlet 234 coupled to the second end 228 of the second attenuating conduit 222, and an outlet 230. The outlet 230 of the first outlet junction 224 may be attached to a discharge conduit 232 coupling the first tuned loop 202 to the second tuned loop 252.

The second tuned loop 252 illustrated in FIG. 2 includes a second inlet junction 256 in fluid communication with the first outlet junction 224. The second inlet junction 256 may be coupled to the first outlet junction 224 directly or indirectly, for example through the discharge conduit 232. The second inlet junction 256 includes an inlet 258, a first outlet 260 and a second outlet 263. The second tuned loop 252 illustrated in FIG. 2 also includes a third attenuating conduit 266 having a first end 264 coupled to the first outlet 260 of the inlet junction 256, having a first length, and having a second end 268 opposite the first end 264.

The second tuned loop 252 illustrated in FIG. 2 also includes a fourth attenuating conduit 272 having a first end 270 coupled to the second outlet 263 of the second tuned loop 252 inlet junction 256, having a length that is approximately equal to the length of the third attenuating conduit 266 plus half a second primary wavelength of vibrations propagating in the fluid flowing through the tuned loop network 200, and having a second end 278. The second primary wavelength is also selected from a range of wavelengths that may be imparted on the fluid by the pump. The second primary wavelength will not be the same as the first primary wavelength since the first tuned loop 202 and the second tuned loop 252 are tuned to attenuate different wavelengths. The second primary wavelength will also typically not be offset from the first primary wavelength by half the first primary wavelength since the purpose of the second tuned loop 252 is not to cancel certain even harmonics of the first tuned loop 202. Rather, the first and second tuned loops 202 and 252 are arranged to provide good attenuation over a range of pulsation frequencies that may be produced, for example, by adjusting the speed of a pump 306.

The second tuned loop 252 illustrated in FIG. 2 further includes a second outlet junction 274 having a first inlet 276 coupled to the second end 268 of the third attenuating conduit 266, a second inlet 284 coupled to the second end 278 of the fourth attenuating conduit 272, and an outlet 280. The outlet 280 of the second outlet junction 274 may be attached to a system through which the fluid is being pumped.

The tuned loops 202, 252 of a pulsation attenuation network 200 may include two conduits 216, 222 and 266, 272 such as pipes of approximately equal area and different lengths that extend from a header 204 at a junction 206, 256 and that are recombined at a pipe 232 or vessel 286. When the areas of the two conduits 216, 222 and 266, 272 are equal the two pulses carried therein can have equal energy so that when they are recombined the attenuation will be more effective.

The junction 206, 256 may divide the fluid stream into two equal parts using two half-round or D-shaped ports that become round and have a constant area. A similar junction 224, 274 may be used to recombine the divided streams at the end of the tuned loop 202, 252.

The shorter of the two conduits 216, 266 may be of a selected length and the longer conduit 222, 272 may be equal to the length of the shorter conduit 216, 266 plus half of a wavelength of vibrations propagating in the fluid of a primary frequency to be canceled. A wavelength may be determined using the speed of the pump 306, the number of compression volumes, and the acoustic velocity of the fluid being pumped. Thus, where a reciprocating compressor is used to compress a gas and propel the gas through the inlet conduit 204, the compressor typically operates over a range of speeds. In an example, a single acting reciprocating compressor operates at 600 rpm, which is equal to a primary frequency of 10 revolutions per second. If the velocity of the gas is 1000 ft/sec. the gas moves 100 feet per revolution of the reciprocating compressor and its half wavelength would be 50 feet. In a double-acting reciprocating compressor, which compresses the gas and propels the gas through the discharge conduit on both strokes, the wavelength is half the wavelength of a single-acting reciprocating compressor so that, in the example provided, half a wavelength would be 25 feet.

In a two-stage pulsation attenuation network 200, the first pulsation attenuation device 202 in the series may be designed to eliminate the most prevalent primary frequency. That primary frequency eliminating pulsation attenuation device 202 may furthermore be the longest of the pulsation attenuation devices 202, 252 in the series of pulsation attenuation devices placed in series to form the pulsation attenuation network 200.

The location of a pulsation attenuation network in relation to the pump 306 or source of the pulsation may affect the efficiency of flow through the system. In an embodiment where the source of the pulsation is a reciprocating compressor pumping natural gas through a natural gas piping system, a header pipe 204 may be employed to carry the compressed gas from the compressor to the tuned loop 202 and that header 204 may have a particular length that may promote pulsation attenuation.

Prior efforts in harmonic cancellation have focused on high frequency pulsations that create noise that is undesirable for humans and have not considered the location of the harmonic cancellation in relationship to the source. In this application, however, the primary pulsation frequency and the low frequency harmonics are the focus.

Tuned loops 202, 252 can have another characteristic that can affect the operation of the pump 306 to which they are attached. In addition to their ability to attenuate pulsations traveling away from a pump 306, they can reflect pulses back to the pump 306 by locating junctions 206, 224, 256, 274 at an appropriate position in relation to the pump 306. For example, an inlet junction 206 may be located at an appropriate distance from a pump outlet 308 to reflect pulses back to the pump 306 so as to reduce pressure at the outlet 308 of the pump 306. Reflected pulses can thus influence the efficiency of a pump 306, recognizing that poorly timed pulses can degrade pump 306 performance, while well timed pulses can improve pump 306 performance. Thus, certain header lengths may also provide improved flow, which may be manifested in terms of increasing flow, decreased pump power consumption, or both.

FIG. 3 illustrates an embodiment of a tuned loop network 300 having a tuned loop 302 in fluid communication with the inlet 304 of a pump 306 and a second tuned loop 352 in fluid communication with the outlet 308 of the pump 306. In the embodiment illustrated in FIG. 3, the inlet 304 may also be referred to as a suction side of the pump 306 and the outlet 308 may also be referred to as a discharge side of the pump 306. Those tuned loops 302 and 352 may be configured as shown in FIGS. 1 or 2 and as described in connection with FIGS. 1 or 2.

Pulsations generally exist in both the inlet 304 and outlet 308 of a pump 306. Therefore, attenuating pulsations in both the inlet 304 and outlet 308 of the pump 306 by applying at least one tuned loop 302 and 352 at each of the inlet 304 and outlet 308 of the pump 306 may be beneficial to reduce inlet 304 pulsations and outlet 308 pulsations.

Figure 4:
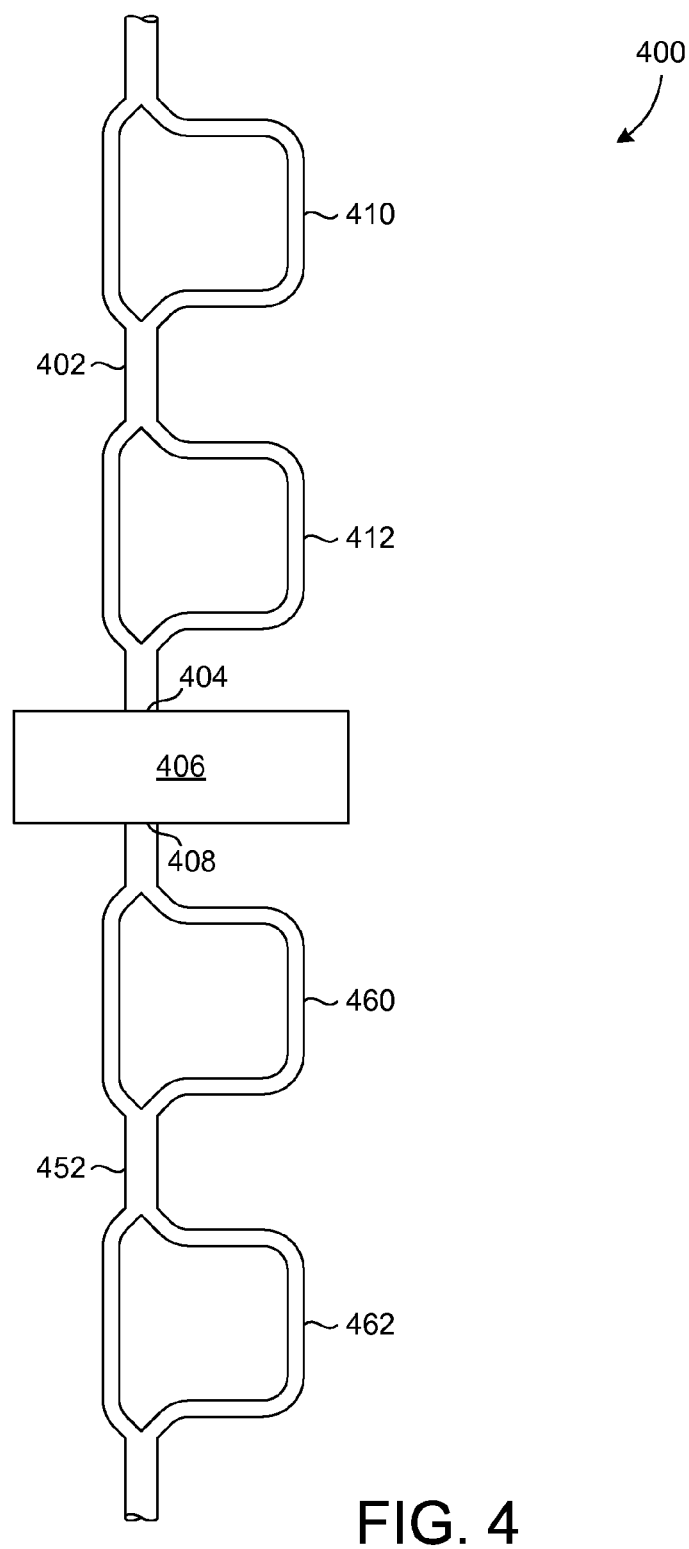
FIG. 4 illustrates an embodiment of a compressor having a series pulsation attenuation device connected at both of the suction and discharge sides of the compressor.

FIG. 4 illustrates yet another embodiment wherein a suction tuned loop network 402 is placed at the suction 404 side of a pump 406 and a discharge tuned loop network 452 is placed at the discharge side 408 of the pump 406. The suction tuned loop network 402 may include any desired number of tuned loops such as, for example the two tuned loops 410 and 412 illustrated in FIG. 4. Similarly, the discharge tuned loop network 452 may include any desired number of tuned loops such as, for example the two tuned loops 460 and 462 illustrated in FIG. 4. The suction tuned loop network 402 and discharge tuned loop network 452 may furthermore be constructed as illustrated and described in connection with FIGS. 1 and 2.

It should be noted that the acoustic velocity of a gas being pumped may vary from the inlet to the outlet of a pump 406 and, for at least that reason, the tuned loop configurations on the inlet 404 side and outlet 408 side of the pump 406 may not be identical. It should also be recognized that a tuned loop network of two or more tuned loops may be used on the inlet 404, the outlet 408, or both the inlet 404 and the outlet 408 of a pump 406.

Simulations have shown that tuned loop networks having three tuned loops are likely to provide substantial benefit over networks having two tuned loops in certain applications and that tuned loop networks having four tuned loops are likely to provide substantial benefit over networks having three tuned loops in certain applications.

Other configurations having two or more tuned loops placed on one or both sides of a pump are also possible to attenuate one or more primary frequencies or an entire range of frequencies. As has been discussed, a range of frequencies may exist where, for example, the speed of a pump 406 such as a compressor is varied.

Tuned loops networks such as those illustrated in FIG. 4 (402 and 452) can create relatively steady pressure in comparison to the pressure pulses created by a pump 406 and, when properly positioned, require less power to create a desired pressure downstream in a pipe or vessel. As compared to existing controls, such as pulsation control bottles and orifices, the pulsation attenuation network is predicted by simulation to reduce suction line and discharge line pressure drops by 93% to 99%. Experiments on an air compressor have shown similar results.

Figure 5:
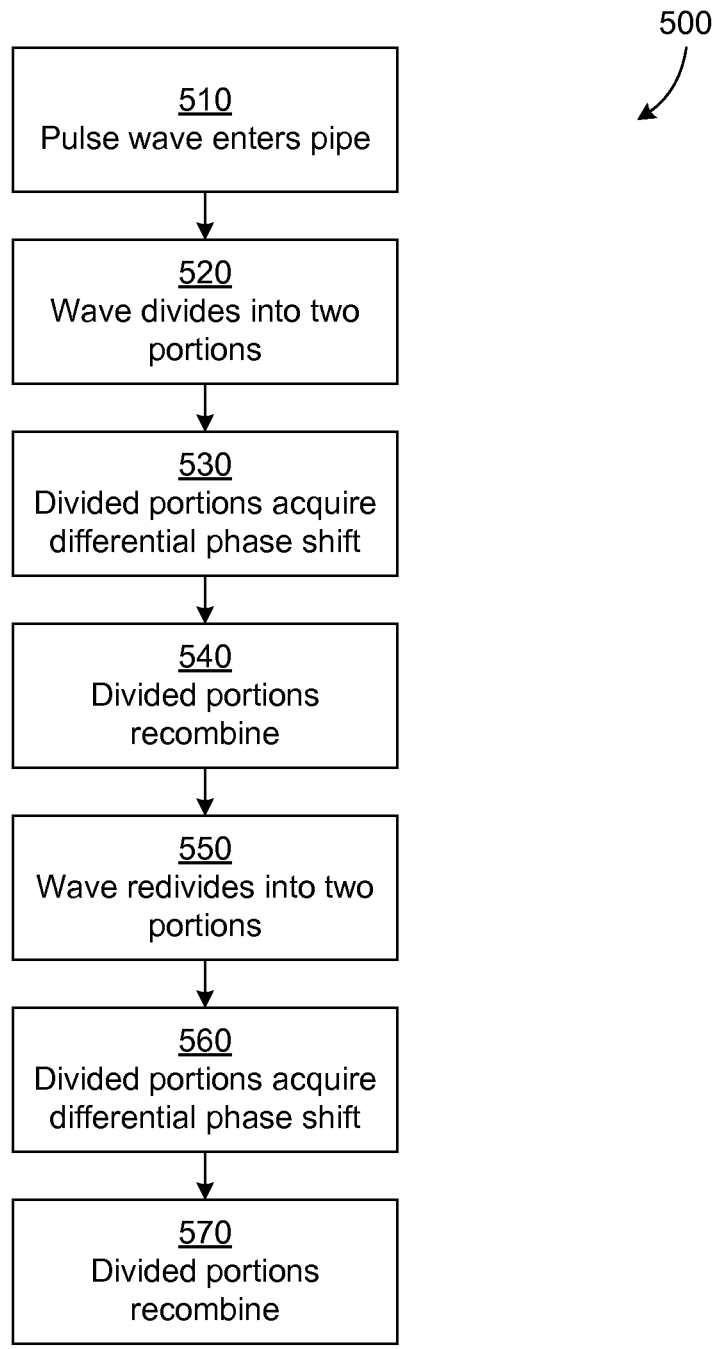
FIG. 5 illustrates an embodiment of a method of attenuating pulsations.

FIG. 5 illustrates an embodiment of a method for attenuating pulsations 500. The method for attenuating pulsations 500 begins with a pulse wave entering a pipe, duct, or conduit at 510. The wave will propagate in a fluid, such as a liquid or gas. At 520, the wave is divided into two parts, for example, by conducting the wave through two or more branch conduits. At 530, the two parts of the divided wave are delayed relative to each other by, for example, causing the parts to travel different distances. The delay results in a differential phase shift at 540, where the parts of the divided wave recombine. This differential phase shift is represented by the difference in the distance the parts travel, divided by the primary wavelength and multiplied by 360 degrees. The lengths of the two branch conduits may be chosen so that the relative phase delay for the primary wavelength is 180 degrees, thereby attenuating the pulsations for that wavelength and its odd harmonics. Moreover, when the pulsations exist in a fluid, the time delay will be equal to the difference in the lengths of the branch conduits times the acoustic velocity of the fluid.

At 550, the merged wave is again divided. At 560, the divided portions of the wave are again phase shifted by causing the divided portions to travel different distances, thereby delaying one wave relative to the other. At 570 the divided portions are once again recombined.

Where, for example, a pump or other mechanism creating pulsations is operable over a range of speeds, the wavelengths chosen for the first loop 520-540 and the second loop 550-570 may be two different wavelengths that fall within the range of primary wavelengths created by that range of speeds. Accordingly, one of the chosen wavelengths will typically not be twice the second chosen wavelength.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. A pump pulsation attenuation device to attenuate a range of pulsation frequencies, comprising: a first inlet junction having an inlet through which a fluid is pumped, the inlet junction further including a first outlet and a second outlet; a first conduit having a first end coupled to the first outlet of the inlet junction, having a first length, and having a second end opposite the first end; a second conduit having a first end coupled to the second outlet of the inlet junction, having a second length approximately equal to the first length plus half a first primary wavelength within a range of wavelengths of vibrations propagating in a fluid pumped by a pump, and having a second end opposite the first end; a first outlet junction having a first inlet coupled to the second end of the first conduit, a second inlet coupled to the second end of the second conduit, and an outlet; a second inlet junction having an inlet in fluid communication with outlet of the first outlet junction, the second inlet junction further including a first outlet and a second outlet; a third conduit of a third length having a first end coupled to the first outlet of the second inlet junction, and having a second end opposite the first end; a fourth conduit of a fourth length approximately equal to the third length plus half a second primary wavelength, the second primary wavelength different from the first primary wavelength, not equal to half the first primary wavelength, and within the range of wavelengths of vibrations propagating in the fluid pumped by the pump, and the fourth conduit having a second end opposite the first end; and a second outlet junction having a first inlet coupled to the second end of the third conduit, a second inlet coupled to the second end of the fourth conduit, and an outlet.

2. The pump pulsation attenuation device of claim 1, further comprising an outlet conduit coupled to the outlet of the second outlet junction.

3. The pump pulsation attenuation device of claim 1, further comprising a vessel coupled to the outlet of the second outlet junction.

4. The pump pulsation attenuation device of claim 1, further comprising an inlet conduit in fluid communication with the first inlet junction, the inlet conduit having an area and wherein the first conduit has an area of approximately one-half the inlet conduit area and the second conduit has an area of approximately one-half the inlet conduit area.

5. The pump pulsation attenuation device of claim 1, wherein the pump includes a reciprocating compressor.

6. The pump pulsation attenuation device of claim 1, wherein the pump pulsation attenuation device is in fluid communication with an inlet of the pump.

7. The pump pulsation attenuation device of claim 1, wherein the pump is a reciprocating compressor.

8. The pump pulsation attenuation device of claim 1, wherein the pump is pumping natural gas.

9. The pump pulsation attenuation device of claim 1, further comprising an inlet conduit having a first end, a second end coupled to the inlet of the first inlet junction, and a length that improves the pressure at the pump.

10. The pump pulsation attenuation device of claim 1, wherein the pump pulsation attenuation device is in fluid communication with an outlet of the pump.

* * * * *